(12) United States Patent
Bishop, III et al.

(10) Patent No.: US 12,175,286 B2
(45) Date of Patent: Dec. 24, 2024

(54) APPLICATION PRIORITY RECOMMENDATION AND ADJUSTMENT BASED ON LINEAR REGRESSION AND MACHINE LEARNING

(71) Applicant: Bank of America Corporation, Charlotte, NC (US)

(72) Inventors: Jack Lawson Bishop, III, Evanston, IL (US); Jason Conrad Starin, Huntersville, NC (US); Carrie E. Gates, Livermore, CA (US)

(73) Assignee: Bank of America Corporation, Charlotte, NC (US)

( * ) Notice: Subject to any disclaimer, the term of this patent is extended or adjusted under 35 U.S.C. 154(b) by 591 days.

(21) Appl. No.: 17/344,712

(22) Filed: Jun. 10, 2021

(65) Prior Publication Data

US 2022/0398129 A1  Dec. 15, 2022

(51) Int. Cl.
 *G06F 9/48* (2006.01)
 *G06F 9/50* (2006.01)

(52) U.S. Cl.
 CPC .......... *G06F 9/4881* (2013.01); *G06F 9/5038* (2013.01)

(58) Field of Classification Search
 CPC .............................. G06F 9/4881; G06F 9/5038
 See application file for complete search history.

(56) References Cited

U.S. PATENT DOCUMENTS

| | | | |
|---|---|---|---|
| 6,917,926 | B2 | 7/2005 | Chen et al. |
| 7,359,979 | B2 | 4/2008 | Gentle et al. |
| 8,856,936 | B2 | 10/2014 | Datta Ray et al. |
| 9,183,047 | B2* | 11/2015 | Lim ...................... G06F 9/5038 |
| 9,501,749 | B1 | 11/2016 | Narsky |
| 9,723,105 | B2 | 8/2017 | Vange et al. |
| 10,083,481 | B2 | 9/2018 | Futch et al. |
| 10,164,891 | B2 | 12/2018 | Stanwood et al. |
| 10,241,505 | B2 | 3/2019 | Cohen et al. |
| 10,291,584 | B2 | 5/2019 | Koripella et al. |
| 10,389,592 | B2 | 8/2019 | Lui et al. |
| 10,420,017 | B2 | 9/2019 | Pinheiro et al. |

(Continued)

OTHER PUBLICATIONS

Bishop III, Jack Lawson et al., "Dynamic Resource Allocation in a Distributed System," U.S. Appl. No. 17/386,314, filed Jul. 27, 2021, 70 pages.

(Continued)

*Primary Examiner* — Benjamin C Wu

(57) ABSTRACT

A system includes a computing infrastructure and an application prioritization system. The computing infrastructure includes a plurality of computing devices configured to implement computing applications. The application prioritization system receives application data associated with the computing applications. A request is received for a priority of a first computing application of the computing applications compared to a second computing application of the computing applications. The application prioritization system determines, using a feedback-based machine learning model, a first priority of the first computing application and a second priority of the second computing application and an explanation of the first and second priorities. A response is provided with an indication of the larger of the first priority and second priority and the explanation.

17 Claims, 3 Drawing Sheets

(56) References Cited

U.S. PATENT DOCUMENTS

| | | | |
|---|---|---|---|
| 10,482,394 | B2 | 11/2019 | Syed et al. |
| 10,511,560 | B2 | 12/2019 | Kursun et al. |
| 10,521,464 | B2 | 12/2019 | Juneja et al. |
| 10,574,748 | B2 | 2/2020 | Doddavula et al. |
| 10,609,045 | B2 | 3/2020 | Lim |
| 10,754,683 | B1* | 8/2020 | Kahn .................. G06F 9/5011 |
| 10,755,195 | B2 | 8/2020 | Motahari Nezhad |
| 10,771,352 | B2 | 9/2020 | Jasen et al. |
| 10,805,235 | B2 | 10/2020 | Kulkarni et al. |
| 10,884,813 | B2 | 1/2021 | Yang et al. |
| 10,891,161 | B2 | 1/2021 | Zhou et al. |
| 10,904,389 | B2 | 1/2021 | Wolthuis et al. |
| 10,938,535 | B2 | 1/2021 | Segev et al. |
| 10,908,960 | B2 | 2/2021 | Qiu et al. |
| 10,908,967 | B2 | 2/2021 | Schmidt et al. |
| 10,925,009 | B2 | 2/2021 | Gutierrez et al. |
| 10,929,198 | B2 | 2/2021 | Liu |
| 10,936,978 | B2 | 3/2021 | Tijerina et al. |
| 10,938,738 | B2 | 3/2021 | Dronen et al. |
| 10,938,741 | B2 | 3/2021 | Hathorn et al. |
| 10,939,167 | B2 | 3/2021 | Chao |
| 10,999,859 | B2 | 5/2021 | Tang |
| 2008/0040364 | A1 | 2/2008 | Li |
| 2013/0042250 | A1* | 2/2013 | Lim .................... G06F 9/4881 |
| | | | 718/103 |
| 2016/0380811 | A1* | 12/2016 | Bhogal .................. H04L 69/24 |
| | | | 709/223 |
| 2019/0114202 | A1* | 4/2019 | Wang .................. G06F 9/5044 |
| 2019/0243644 | A1 | 8/2019 | Jose et al. |
| 2020/0026579 | A1* | 1/2020 | Bahramshahry ........ G06F 9/5077 |
| 2020/0092319 | A1* | 3/2020 | Spisak .................... G06N 7/01 |
| 2020/0267066 | A1 | 8/2020 | Pang et al. |
| 2020/0296155 | A1* | 9/2020 | McGrath ............... G06F 9/5027 |
| 2020/0334614 | A1* | 10/2020 | Javaid .................. G06Q 10/109 |
| 2021/0089362 | A1 | 3/2021 | Iwasa et al. |
| 2021/0100023 | A1 | 4/2021 | Wei et al. |
| 2021/0105197 | A1 | 4/2021 | Balle et al. |
| 2021/0111843 | A1 | 4/2021 | Zhang |
| 2021/0112546 | A1 | 4/2021 | Adamou et al. |
| 2021/0127417 | A1 | 4/2021 | Lee et al. |
| 2021/0136785 | A1 | 5/2021 | Elsayed et al. |
| 2022/0261274 | A1* | 8/2022 | Raghavendran .......... G06F 8/60 |
| 2022/0318057 | A1* | 10/2022 | Hebbalalu ............ G06F 9/5038 |
| 2023/0030161 | A1* | 2/2023 | Bishop, III .......... G06F 9/5044 |
| 2023/0031049 | A1* | 2/2023 | Bishop, III .......... G06F 9/4881 |

OTHER PUBLICATIONS

Bishop III, Jack Lawson et al., "Query-Response System for Identifying Application Priority," U.S. Appl. No. 17/386,361, filed Jul. 27, 2021, 69 pages.

* cited by examiner

APPLICATION PRIORITY RECOMMENDATION AND ADJUSTMENT BASED ON LINEAR REGRESSION AND MACHINE LEARNING

TECHNICAL FIELD

The present disclosure relates generally to computing application and infrastructure resource allocation management. More particularly, the present disclosure is related to an application prioritization system.

BACKGROUND

Specialized and scarce computing or other resources for enabling remediation of computing applications may be distributed amongst a number of different computing applications, users, computing devices, or servers. Computing applications are generally used to perform computing tasks, such as analyzing information, presenting information, storing information, and the like.

SUMMARY

Previous technology used to manage computing application resource constraints may suffer from a number of drawbacks. For example, previous technology can be inefficient and provides little or no insights into the relative importance of a given application for meeting the needs of users, organizations, businesses, working groups, or the like. For example, previous technology is unable to automatically identify computing applications that are more critical for ensuring required tasks can be efficiently and reliably completed in a timely manner. As such, the allocation of infrastructure (e.g., server space, computing nodes, application security remediation, etc.) for these applications is inefficient and can fail to meet business needs, such that certain required tasks may not be completed successfully or on time (e.g., application security remediation). Furthermore, specialized and/or scarce users (e.g., individuals with specialized training, knowledge, and/or responsibilities)may be tasked with advising those responsible for creating and maintaining computing applications. Those specialized/scarce users may be a constraint for completing tasks requested by computing application teams. This disclosure recognizes that machine-learning-derived prioritization can help prioritize and defend resource allocation and can act as an indicator for constraint analysis and related activities.

Certain embodiments of this disclosure provide unique solutions to technical problems of previous application management technology, including those problems identified above, by providing tools for reliably and efficiently determining relative prioritizations for different computing applications, for example, such that appropriate infrastructure or other resources can be allocated to higher priority applications. For example, the disclosed system provides several technical advantages over previous technology, which include: (1) providing previously unavailable insights into the relative ranking of computing applications with respect to real-world tasks being completed with the applications; (2) providing fine-grained application priority information for a large or distributed computing infrastructure; and (3) facilitating the analysis of possible scenarios and their impact on application prioritization and/or infrastructure functionality. As such, this disclosure may improve the function of computer systems used to help manage computing applications and associated hardware infrastructures, such that, for example, the appropriate hardware or user action (e.g., application security remediation, processing, memory, and networking resources) can be made available for prioritized computing applications.

In certain embodiments, this disclosure may particularly be integrated into a practical application of an application prioritization system, which uses a specially structured machine learning model along with linear regression in order to iteratively determine priorities for different computing applications. This analysis may be geared towards providing a response to a particular request or query for information. For instance, the application prioritization system may provide human-interpretable metrics that can be used to not only adjust resource allocation based on application priority but also understand the underlying types or categories of applications that require prioritization. For example, the application prioritization system may automatically generate a response indicating that a given application is more critical than another application because of one or more user-, business-, or organization-based needs. For instance, a word-processing application that is used by a majority of users may be prioritized over a specialized application used by only a handful of users. Information determined by the application prioritization system may be used to reallocate computing applications or user action(s) amongst available computing resources, such that more resources are available to higher priority applications.

Certain embodiments of this disclosure may include some, all, or none of these advantages. These advantages and other features will be more clearly understood from the following detailed description taken in conjunction with the accompanying drawings and claims.

In an embodiment, a system includes a computing infrastructure and an application prioritization system. The computing infrastructure includes a plurality of computing devices configured to implement computing applications. Execution of computing tasks associated with the computing applications is distributed amongst the plurality of computing devices. A memory of the application prioritization system stores computing task rules, which include, for each type of the computing tasks associated with the computing applications, a predefined value indicating an extent to which the type of the computing task is critical for meeting a predefined computing infrastructure demand. The application prioritization system receives application data associated with the computing applications. The application data includes, for each computing application, characteristics of the computing application and users of the computing application. A request is received for a priority of a first computing application of the computing applications compared to a second computing application of the computing applications. The application prioritization system determines, by applying a feedback-based machine learning model to at least a portion of the application data, the query, and the computing task rules, a first priority of the first computing application and a second priority of the second computing application and an explanation of the first and second priorities. The first and second priorities provide an indication of whether the first computing application or the second computing application is more critical to functions of the computing infrastructure. The application prioritization system provides a response with an indication of the larger of the first priority and second priority and the explanation.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
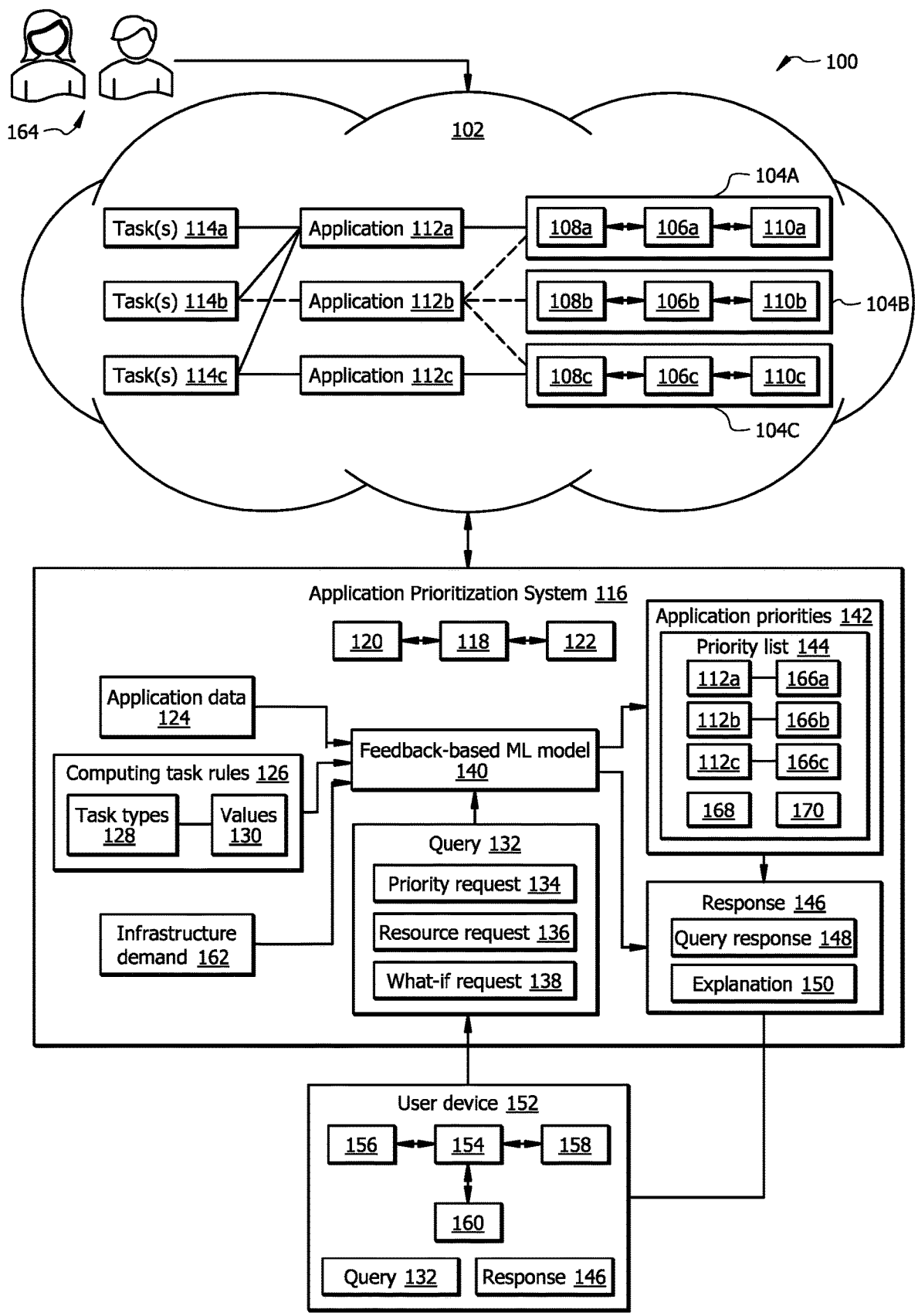
FIG. 1 is a schematic diagram of an example system configured for application prioritization.

As described above, previous technology fails to provide definitive tools for efficiently and reliably managing computing application resource allocation. For instance, previous technology fails to provide understandable and actionable insights into the relative importance of a given application for meeting future needs (e.g., related to resources expended to remediate security vulnerabilities). For example, previous technology is unable to automatically identify computing applications that are more critical for ensuring required tasks can be efficiently and reliably completed in a timely manner. As such, the allocation of infrastructure (e.g., security vulnerability remediation efforts, server space, computing nodes, etc.) for executing these applications is inefficient and can fail to meet users' needs, such that certain required tasks may not be completed successfully or on time. The infrastructure monitoring and evaluation system described in this disclosure overcomes these and other problems of previous technology by providing efficient and reliable user-interpretable information about computing applications and associated hardware infrastructure and relative prioritization, such that appropriate decisions can be taken to improve system performance.
Application Management and Evaluation System FIG. 1 is a schematic diagram of an example system 100 for improving the evaluation and management of computing applications 112a-c implemented in a computing infrastructure 102. The system 100 includes a computing infrastructure 102, an application prioritization system 116, and a user device 152. The system 100 generally facilitates the determination of application priorities 142 for the computing applications 112a-c implemented in (e.g., hosted by) the computing infrastructure 102. In some cases, the application priorities 142 may be specific to a received query 132 and may be determined based on application data 124 and/or predefined computing task rules 126, which include a predefined value 130 indicating an extent to which each type 128 of the computing task 114a-c associated with the computing applications 112a-c is critical for meeting a predefined computing infrastructure demand 162. The infrastructure demand 162 generally corresponds to the amount of computing tasks 114a-c expected to be performed during future times. The application priorities 142 may be used to generate a structured response 146 which may include not only a query response 148 that includes the information requested in the query 132 but also an explanation 150 in a natural language that provides context for the response 146, as described in greater detail below.

Computing Infrastructure

The computing infrastructure 102 may include any number of computing devices 104a-c that are operable to implement the computing applications 112a-c. The computing devices 104a-c may be located together or distributed in different locations. As illustrated in FIG. 1, each computing device 104a-c includes a processor 106a-c, memory 108a-c, and network interface 11a-c. The processor 106a-c of each of the computing devices 104a-c includes one or more processors. The processor 106a-c is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 106a-c may be a programmable logic device, a microcontroller, a microprocessor, or any suitable combination of the preceding. The processor 106a-c is communicatively coupled to and in signal communication with the memory 108a-c and the network interface 110a-c, and any other components of the device 104a-c. The one or more processors 106a-c are configured to process data and may be implemented in hardware and/or software. For example, the processor 106a-c may be 8-bit, 16-bit, 32-bit, 64-bit or of any other suitable architecture. The processor 106a-c may include an arithmetic logic unit (ALU) for performing arithmetic and logic operations, processor registers that supply operands to the ALU and store the results of ALU operations, and a control unit that fetches instructions from memory 108a-c and executes them by directing the coordinated operations of the ALU, registers and other components. In an embodiment, the function of the devices 104a-c described herein is implemented using logic units, FPGAs, ASICs, DSPs, or any other suitable hardware or electronic circuitry.

The memory 108a-c of each of the computing devices 104a-c is operable to store any data, instructions, logic, rules, or code operable to execute the functions of computing devices 104a-c. The memory 108a-c includes one or more disks, tape drives, or solid-state drives, and may be used as an over-flow data storage device, to store programs when such programs are selected for execution, and to store instructions and data that are read during program execution. The memory 108a-c may be volatile or non-volatile and may comprise read-only memory (ROM), random-access memory (RAM), ternary content-addressable memory (TCAM), dynamic random-access memory (DRAM), and static random-access memory (SRAM).

The network interface 110a-c of each of the computing devices 104a-c is configured to enable wired and/or wireless communications. The network interface 110a-c is configured to communicate data between the corresponding computing device 104a-c and other network devices, systems, or domain(s), such as the application prioritization system 116. The network interface 110a-c is an electronic circuit that is configured to enable communications between devices. For example, the network interface 110a-c may include one or more serial ports (e.g., USB ports or the like) and/or parallel ports (e.g., any type of multi-pin port) for facilitating this communication. As a further example, the network interface 110a-c may include a WIFI interface, a local area network (LAN) interface, a wide area network (WAN) interface, a modem, a switch, or a router. The processor 106a-c is configured to send and receive data using the network interface 110a-c. The network interface 110a-c may be configured to use any suitable type of communication protocol as would be appreciated by one of ordinary skill in the art. The network interface 110a-c communicates application data 124 to the application prioritization system 116, as described further below.

The computing devices 104a-c are generally configured to implement computing applications 112a-c. The computing applications 112a-c may be any software packages, programs, or code used, at least in part, to perform computing tasks 114a-c. For example, computing applications 112a-c may be hosted by the computing devices 104a-c of the computing infrastructure and accessed by users 164 to perform computing tasks 114a-c. Examples of computing tasks 114a-c include document generation, data analysis, report generation, electronic communication, database management, data presentation, media editing, media presentation, and the like. Each of the computing applications 112a-c is generally associated with one or more computing tasks 114a-c. For example, a word-processing application 112a-c may be associated with a report generation task 114a-c. More generally, a given computing application 112a-c may be associated with any number (i.e., one or more) computing tasks 114a-c. For instance, in the example of FIG. 1, the first computing application 112a is associated with three computing tasks 114a-b (e.g., a word-processing application 112a may be associated with a report generation task 114a, a table generation task 114b, and a general text preparation task 114c), while the second and third computing applications 112b,c are each associated with a single corresponding task 114b,c (e.g., a data analysis software application 112b and a database management application 112c may be associated with a data analysis task 114b and database management task 114c, respectively). The application prioritization system 116, described further below, generally identifies application priorities 142, such that critical tasks 114a-c can reliably be completed and such that resources of the computing infrastructure 102 (e.g., the processors 106a-c, memories 108a-c, and network interfaces 110a-c of the computing devices 104a-c) are appropriately allocated to complete critical tasks 114a-c.

The various computing tasks 114a-c associated with (e.g., performed using) the computing applications 112a-c may be distributed amongst the various computing devices 104a-c. For instance, as shown in the example of FIG. 1, all of the tasks 114a-c associated with the first computing application 112a may be performed by a single computing device 104a, while a single task 114b associated with the second computing application 112b may be distributed amongst multiple computing devices 104a-c. These distributions of computing tasks 114a-c and computing applications 112a-c amongst the computing devices 104a-c are examples only. Although FIG. 1 shows a particular number of computing tasks 114a-c being associated with each computing application 112a-c and being distributed amongst a given number of the computing device 104a-c, it should be understood that a computing application 112a-c may be associated with any appropriate number of computing tasks 114a-c, each of which may be distributed amongst any number of computing devices 104a-c to facilitate their execution.

Application Prioritization System

The application prioritization system 116 generally receives application data 124 from the computing infrastructure 102 along with a query 132 provided by a user device 152 and uses this information to determine application priorities 142 and/or a response 146 to the received query 132. As illustrated in the example of FIG. 1, the application prioritization system 116 includes a processor 118, memory 120, and network interface 122. The processor 118 of the application prioritization system 116 includes one or more processors. The processor 118 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 118 may be a programmable logic device, a microcontroller, a microprocessor, or any suitable combination of the preceding. The processor 118 is communicatively coupled to and in signal communication with the memory 120 and network interface 122. The one or more processors are configured to process data and may be implemented in hardware and/or software. For example, the processor 118 may be 8-bit, 16-bit, 32-bit, 64-bit or of any other suitable architecture. The processor 118 may include an arithmetic logic unit (ALU) for performing arithmetic and logic operations, processor registers that supply operands to the ALU and store the results of ALU operations, and a control unit that fetches instructions from memory 120 and executes them by directing the coordinated operations of the ALU, registers and other components. In an embodiment, the function of the application prioritization system 116 described herein is implemented using logic units, FPGAs, ASICs, DSPs, or any other suitable hardware or electronic circuitry.

The memory 120 of the application prioritization system 116 is operable to store any data, instructions, logic, rules, or code operable to execute the functions of the application prioritization system 116. The memory 120 may store the computing task rules 126, application data 124, infrastructure demand 162, instructions for implementing the feedback-based machine learning (ML) models 140, received queries 132, determined application priorities 142, determined responses 146, as well as any other logic, code, rules, and the like to execute functions of the application prioritization system 116. The memory 120 includes one or more disks, tape drives, or solid-state drives, and may be used as an over-flow data storage device, to store programs when such programs are selected for execution, and to store instructions and data that are read during program execution. The memory 120 may be volatile or non-volatile and may comprise read-only memory (ROM), random-access memory (RAM), ternary content-addressable memory (TCAM), dynamic random-access memory (DRAM), and static random-access memory (SRAM).

The network interface 122 of the application prioritization system 116 is configured to enable wired and/or wireless communications. The network interface 122 is configured to communicate data between the application prioritization system 116 and other network devices, systems, or domain(s), such as the computing infrastructure 102 and the user device 152. The network interface 122 is an electronic circuit that is configured to enable communications between devices. For example, the network interface 122 may include one or more serial ports (e.g., USB ports or the like) and/or parallel ports (e.g., any type of multi-pin port) for facilitating this communication. As a further example, the network interface 122 may include a WIFI interface, a local area network (LAN) interface, a wide area network (WAN) interface, a modem, a switch, or a router. The processor 118 is configured to send and receive data using the network interface 122. The network interface 122 may be configured to use any suitable type of communication protocol as would be appreciated by one of ordinary skill in the art. The network interface 122 receives the application data 124 and/or infrastructure demand 162 provided by the computing infrastructure 102 and communicates the response 146 for use by the user device 152.

The application prioritization system 116 may request and subsequently receive the application data 124 from the computing infrastructure 102. In some cases, the application prioritization system 116 may monitor operations of the computing infrastructure 102 to determine all or a portion of the application data 124 over time. The application data 124 generally includes characteristics of each of the computing applications 112a-c and users 164 of the computing applications 112a-c. For instance, the application data 124 may include an indication of coding language(s) employed by the computing applications 112a-c, training or skill levels of the users 164 of the computing applications 112a-c, number of users 164 of the computing applications 112a-c, an amount of time during which the computing applications 112a-c are used (e.g., or a frequency of use), an amount of time the computing applications 112a-c are used per user 164 (e.g., or a frequency of use per user 164), a predefined score indicating an extent to which the computing applications 112a-c are critical to meeting the infrastructure demand 162 (e.g., to execute one or more computing tasks 114a-c), and the like. In some embodiments, the application data 124 includes a current allocation of the computing tasks 114a-c associated with the computing applications 112a-c amongst the computing devices 104a-c of the computing infrastructure 102. For example, the application data 124 may indicate how many of the resources (e.g., processors 106a-c, memories 108a-c, and/or network interfaces 110a-c) are consumed to accomplish various tasks 114a-c and/or implement various computing applications 112a-c.

The application prioritization system 116 may similarly receive or determine the infrastructure demand 162. For example, the computing infrastructure 102 may provide an indication (e.g., as a schedule or the like) of upcoming computing tasks 114a-c expected to be executed by the computing infrastructure 102. Also or alternatively, the application prioritization system 116 may determine the infrastructure demand 162, for example, by monitoring usage of the computing infrastructure 102, identifying usage trends, and predicting the infrastructure demand 162 based on the trends.

The application prioritization system 116 receives a query 132, which includes at least one request 134, 136, 138. For example, the query 132 may include a priority request 134, such as a request for a priority of a first computing application 112a of the computing infrastructure 102 compared to that of a second computing application 112b of the computing infrastructure 102. As another example, the query 132 may include a resource request 136, such as a request for an amount of the computing infrastructure 102 (e.g., of the processors 106a-c, memories 108a-c, and/or network interfaces 110a-c) that is used to execute a given computing application 112a-c and/or complete a given computing task 114a-c. As yet another example, the query 132 may include a "what-if" request 138, such as request for an anticipated impact 170 of a scenario related to, for example, removal of a given computing application 112a-c from the computing infrastructure 102 and/or removal of a computing device 104a-c from the computing infrastructure 102.

The application prioritization system 116 determines, by applying a feedback-based ML model 140 to at least a portion of the application data 124, the query 132, the computing task rules 126, and/or the infrastructure demand 162, application priorities 142. The portion of the application data 124 to which the feedback-based ML model 140 is applied may not be pre-defined (e.g., by a user or administrator). For example, the portion of the application data 124 may be selected arbitrarily. In some cases, the portion of the application data 124 is derived via machine learning. The feedback-based ML model 140 generally employs a combination of one or more machine learning models and linear regression in an iterative fashion to determine an appropriate application prioritizations 142 for generating a response 146 to the received query 132. For example, the feedback-based ML model 140 may be applied to the application data 124, the query 132, and the computing task rules 126 to iteratively determine factors and corresponding weights for the first computing application 112a and the second computing application 112b (see FIG. 2 and corresponding description below). A first priority 166a (e.g., or a priority score) may be determined for the first computing application 112a based on the factors and weights for the first computing application 112a, and a second priority 166b (e.g., or a priority score) may be determined for the second computing application 112b based on the factors and weights determined for the second computing application 112b. The first and second priorities 166a,b provide an indication of whether the first computing application 112a or the second computing application 112b is more critical to functions of the computing infrastructure 102 (e.g., for meeting the infrastructure demand 162). The query response 148 may be determined from a comparison of these priorities 166a,b (e.g., such that the computing application 112a,b with the higher priority 166a,b is indicated as the higher priority computing application 112a,b in the query response 148). Further details of an example feedback-based ML model 140 and its implementation are described below with respect to FIG. 2.

The application priorities 142 may include a priority list 144 with the application priorities 166a-c determined for the computing applications 112a-c. For example, for a priority request 134 for an indication of a priority of a given computing application 112a compared to that of one or more other computing applications 112b,c, the priority list 144 may include a ranking of the priorities 166a-c of these computing applications 112a-c. In some cases, the priority list 144 may be limited to information specifically associated with the query 132. For instance, if the priority request 134 corresponds to a request for a relative priority of the first computing application 112a compared to that of the second computing application 112b, processing resources of the application prioritization system 116 may be saved by limiting the analysis performed using the feedback-based ML model 140 to the computing applications 112a,b in question. As another example, for a resource request 136, the priority list 144 may include a ranked list of the amount 168 of the computing resources (e.g., the processors 106a-c, memories 108a-c, and/or network interfaces 110a-c) consumed by one or more of the computing applications 112a-c and/or one or more of the computing tasks 114a-c. As yet another example, for a what-if request 138, the priority list 144 may include an anticipated impact 170 of a scenario indicated by the what-if request 138.

The application prioritization system 116 then generates a response 146 to the query 132 (e.g., to one or more requests 134, 136, 138 included in the query 132).

Appropriate entries from the priority list 144 may be selected to include in the query response 148. For example, for a priority request 134 associated with a comparison of a subset of all computing applications 112a-c, the portion of the relative application priorities 166a-c associated with the priority request 134 may be included in the query response 148. Similarly, the query response 148 may include the amount 168 of computing resources consumed by computing applications 112a-c and/or computing tasks 114a-c indicated in a given resource request 136. For a what-if request 138, the query response 148 generally includes the anticipated impact 170.

The application prioritization system 116 may further determine an explanation 150 to provide along with the query response 148. For example, for a priority request 134 for an indication of a relative priority of a given computing application 112a compared to that of one or more other computing applications 112b,c, the explanation 150 may include a natural language description of the computing tasks 114*a-c* and/or associated analytical, organizational, or business needs that are being prioritized in order to reach the determined query response 148. For instance, if the query 132 includes a priority request 134 to compare the priority 166*a* of the first computing application 112*a* to the priority 166*b* of the second computing application 112*b* and the query response 148 indicates that the first computing application 112*a* has a higher priority 166*a*, the explanation 150 may include an indication of why the first computing application 112*a* has a higher priority 166*a*. For example, the explanation 150 may indicate that the first computing application 112*a* is prioritized because it can be used for a number of computing tasks 114*a-c* critical to the infrastructure demand 162, while the second computing application 112*b* is used for only a single computing task 114*b*, for a less critical computing task 114*b*, or the like. As another example, if the query 132 includes a resource request 136 to indicate the amount of computing resources expended to execute the first computing application 112*a*, the explanation 150 may include an indication of which computing tasks 114*a-c* are being executed by the various computing devices 104*a-c*. As yet another example, if the query 132 includes a what-if request 138 to indicate an anticipated impact 170 of a scenario associated with the what-if request 138, the explanation 150 may include an indication of computing tasks 114*a-c*, computing applications 112*a-c*, users 164, computing devices 104*a-c*, organizational/business, units, or the like that will experience a change in service because of the anticipated impact 170.

The response 146 is then provided to the user device 152, such that it may be reviewed and used as appropriate. User device 152 is described in greater detail below. In some cases, the response 146 provides previously unavailable information for appropriately tuning the allocation of computing tasks 114*a-c* and/or computing applications 112*a-c* amongst the computing devices 104*a-c* of the computing infrastructure 102, such that the computing infrastructure 102 operates more efficiency and reliably. For example, without the insights provided by the response 146, computing devices 104*a-c* assigned to certain tasks 114*a-c* and/or computing applications 112*a-c* may have been idle, while another computing device 104*a-c* was operating beyond its capacity and was unable to meet the infrastructure demand 162. The information provided in the response 146 generated by the application prioritization system 116 thus solves these and other technological problems of previous technology.

User Device

The user device 152 is generally a computer or other device, such a smart phone, tablet, personal assistant device, or the like, that is configured to receive a query 132 input by a user, provide the query 132 to the application prioritization system 116, receive the corresponding response 146, and provide a human-interpretable presentation of at least a portion of the response 146 (e.g., as displayed information, an audible message, or the like). The user device 152 includes a processor 154, memory 156, network interface 158, and output device 160. The processor 154 of the user device 152 includes one or more processors. The processor 154 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 154 may be a programmable logic device, a microcontroller, a microprocessor, or any suitable combination of the preceding. The processor 154 is communicatively coupled to and in signal communication with the memory 156, network interface 158, and output device 160. The one or more processors are configured to process data and may be implemented in hardware and/or software. For example, the processor 154 may be 8-bit, 16-bit, 32-bit, 64-bit or of any other suitable architecture. The processor 154 may include an arithmetic logic unit (ALU) for performing arithmetic and logic operations, processor registers that supply operands to the ALU and store the results of ALU operations, and a control unit that fetches instructions from memory 156 and executes them by directing the coordinated operations of the ALU, registers and other components. In an embodiment, the function of the user device 152 described herein is implemented using logic units, FPGAs, ASICs, DSPs, or any other suitable hardware or electronic circuitry.

The memory 156 of the user device 152 is operable to store any data, instructions, logic, rules, or code operable to execute the functions of the user device 152. The memory 156 may store the query 132 and corresponding response 146, as well as any other logic, code, rules, and the like to execute functions of the user device 152, for instance, for appropriately outputting the response 146 via the output device 160. The memory 156 includes one or more disks, tape drives, or solid-state drives, and may be used as an over-flow data storage device, to store programs when such programs are selected for execution, and to store instructions and data that are read during program execution. The memory 156 may be volatile or non-volatile and may comprise read-only memory (ROM), random-access memory (RAM), ternary content-addressable memory (TCAM), dynamic random-access memory (DRAM), and static random-access memory (SRAM).

The network interface 158 of the user device 152 is configured to enable wired and/or wireless communications. The network interface 158 is configured to communicate data between the user device 152 and other network devices, systems, or domain(s), such as the application prioritization system 116. The network interface 158 is an electronic circuit that is configured to enable communications between devices. For example, the network interface 158 may include one or more serial ports (e.g., USB ports or the like) and/or parallel ports (e.g., any type of multi-pin port) for facilitating this communication. As a further example, the network interface 158 may include a WIFI interface, a local area network (LAN) interface, a wide area network (WAN) interface, a modem, a switch, or a router. The processor 154 is configured to send and receive data using the network interface 158. The network interface 158 may be configured to use any suitable type of communication protocol as would be appreciated by one of ordinary skill in the art. The network interface 158 provides the query 132 and receives the corresponding response 146.

The output device 160 is any appropriate device for providing the received response 146 in a human-interpretable format, such as a textual, graphical, audible, and/or audiovisual format. For instance, the output device 160 may include a display device that presents the response 146 as text and/or graphically (e.g., as a table or plot illustrating the information included in the response 146). In some cases, the output device 160 may include a speaker for providing an audible indication of at least a portion of the response 146. For example a speaker may output an indication of the query response 148 and/or explanation 150 in any appropriate language.

In an example operation of the system 100 of FIG. 1, the application prioritization system 116 monitors usage of the computing infrastructure 102 to determine the application data 124 over a period of time. The application prioritization system 116 then determines the infrastructure demand 162 expected to be encountered in the future (e.g., based on computing tasks 114a-c performed over the period of time used to determine the application data 124). Meanwhile, the computing task rules 126 are stored in the application prioritization system 116, such that a value 130 indicative of the importance of each type 128 of the computing tasks 114a-c is available to aid in efficiently determining application priorities 142 using the feedback-based ML model 140.

At some point during operation of the system 100, a query 132 is received that includes a priority request 134 for the priority of the first computing application 112a compared to that of the second computing application 112b. For example, the priority request 134 may include the text "Should I prioritize the first application or the second application?" The application prioritization system 116 determines, by applying the feedback-based ML model 140 to the application data 124, the query 132, and the computing task rules 126, the relative priority 166a of the first computing application 112a compared to the priority 166b of the second computing application 112b. A query response 148 is determined from the priorities 166a,b. For example, the query response 148 may indicate that the first computing application 112a has a higher priority 166a than the priority 166b of the second computing application 112b. An explanation 150 of the relative priorities 166a,b is also determined. For example, the explanation 150 may indicate "The first application is higher priority because it is critical for a larger number of computing tasks that will be executed in the future." The response 146 that includes both the query response 148 and the explanation 150 is received by the user device 152 and may be used to ensure that the higher priority first computing application 112a is reliably serviced by administrators of the computing infrastructure 102 and is allocated sufficient resources of the computing infrastructure 102.

At another point during operation of the system 100, a query 132 is received that includes a resource request 136 for an amount 168 of the computing infrastructure 102 that is used to execute the first computing application 112a. For example, the resource request 136 may include "What resources of the computing infrastructure are used for the first application?" The application prioritization system 116 determines, by applying the feedback-based ML model 140 to at least the application data 124 and the query 132, the amount 168 of the computing infrastructure 102 that is used to execute the first computing application 112a. A query response 148 is determined from the determined amount 168. For example, the query response 148 may indicate that the first computing application 112a consumes a portion of the resources (e.g., the processors 106a-c, memories 108a-c, and network interfaces 110a-c) of the various computing devices 104a-c of the computing infrastructure. An explanation 150 of the amount 168 is also determined. For example, the explanation 150 may indicate "The first application consumes portions of the first application to execute the first and second tasks and resources of the second and third computing devices to execute the third computing task." The response 146 that includes both the query response 148 and the explanation 150 is received by the user device 152 and provides previously unavailable insights into the more granular operations of the computing infrastructure 102, which can be used to improve operation of the computing infrastructure 102.

At another point during operation of the system 100, a query 132 is received that includes a what-if request 138 for an anticipated impact 170 of a scenario corresponding to removal of the first computing application 112a from the computing infrastructure 102. For example, the what-if request 138 may include "What if the first application were no longer hosted by the computing infrastructure?" The application prioritization system 116 determines, by applying the feedback-based ML model 140 to at least the application data 124, the query 132, and the computing task rules 126, the anticipated impact 170 of the scenario. The anticipated impact 170 may indicate an amount of computing tasks 114a-c that would fail to be completed when the first computing application 112a is no longer hosted. The query response 148 is determined from the anticipated impact 170 (e.g., to indicate "the first, second, and third tasks would fail to be performed if the first application was no longer hosted."). An explanation 150 of the anticipated impact 170 may also be determined. For example, the explanation 150 may indicate "Removal of the first application is unadvised, because the first, second, and third computing tasks will become unavailable to users." The response 146 that includes both the query response 148 and the explanation 150 is received by the user device 152 and provides previously unavailable insights into the effects of possible changes to software implemented using the computing infrastructure 102.

At yet another point during operation of the system 100, a query 132 is received that includes a what-if request 138 for an anticipated impact 170 of a scenario corresponding to removal of the first computing device 104a from the computing infrastructure 102. For example, the what-if request 138 may include "What if the first computing device was uninstalled from the computing infrastructure?" The application prioritization system 116 determines, by applying the feedback-based ML model 140 to at least the application data 124, the query 132, and the computing task rules 126, the anticipated impact 170 of the scenario. The anticipated impact 170 may indicate an amount of computing tasks 114a-c and/or computing applications 112a-c that would fail to be completed or executed when the first computing device 104a is removed. The query response 148 is determined from the anticipated impact 170 (e.g., to indicate "the first, second, and third tasks would fail to be performed if the first computing device was removed."). An explanation 150 of the anticipated impact 170 may also be determined. For example, the explanation 150 may indicate "Removal of the first computing device is unadvised, because the remaining computing devices lack the capacity to complete these computing tasks." The response 146 that includes both the query response 148 and the explanation 150 is received by the user device 152 and provides previously unavailable insights into the effects of possible changes to the physical hardware of the computing infrastructure 102.

Example Operation of the Feedback-Based Machine Learning Model

Figure 2:
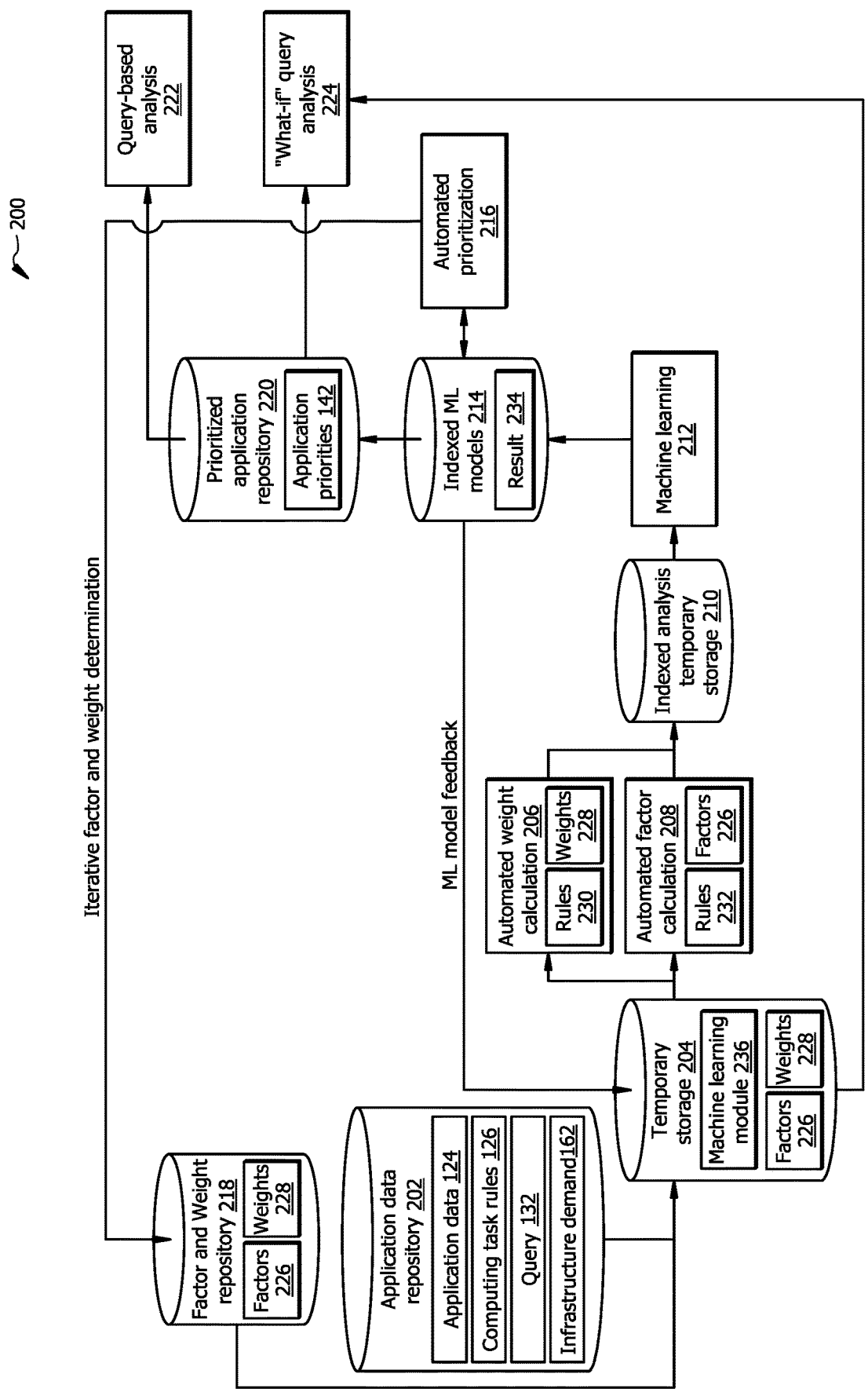
FIG. 2 is a flow diagram illustrating example operations associated with the application prioritization system of FIG. 1.

FIG. 2 is a flow diagram 200 illustrating an example implementation of the feedback-based ML model 140 of FIG. 1. Functions of the flow diagram 200 are generally performed using the processor 118, memory 120, and network interface 122 of the application prioritization system 116 of FIG. 1. For instance, the various repositories 202, 218 may be stored using the memory 120 of FIG. 1. Calculations 206, 208, machine learning 212, automated prioritization 216, and analyses 222, 224 may be performed using the processor 118 of FIG. 1. The flow diagram 200 includes two feedback loops, one for ML model feedback (e.g., to implement various indexed machine learning models 214) and another for iterative factor 226 and weight 228 determination as described in greater detail below.

The operation of the feedback-based ML model 140 may begin from the application data repository 202 and a factor and weight repository 218. The application data repository 202 may store the application data 124, computing task rules 126, query 132, and/or infrastructure demand 162 described with respect to FIG. 1 above. As such, the application data repository 202 may store application metadata for the applications 112*a-c*, including but not limited to information about names of the applications 112*a-c*, data operated on by the applications 112*a-c*, availability of the applications 112*a-c*, deployment zones of the applications 112*a-c*, training of users 164 of the applications 112*a-c*, programming languages used by the applications 112*a-c*, and the like.

The factor and weight repository 218 stores values for factors 226 and weights 228, which are iteratively determined by the feedback-based ML model 140. For example, factors 226 may be values that correspond to particular characteristics of the computing applications 112*a-c*, the computing tasks 114*a-c* performed with these computing applications 112*a-c*, the users 164 of the computing applications 112*a-c*, and the like. For instance, factors 226 may be values that correspond to a metric of a programming language used by a computing application 112*a-c*, may include but is not limited to an amount of training required for users 164 of a computing application 112*a-c*, an operational tier of a computing application 112*a-c*, and the like. As described further below, weights 228 for each of these factors 226 are iteratively refined to eventually perform an automated prioritization 216, which results in the determination of the application priorities 142 of FIG. 1. In the initial iteration, there may not be an initial value of the factors 226 and weights 228. Instead, values of the factors 226 and weights 228 may only be determined via subsequent steps of the flow diagram 200 (e.g., at calculations 206 and 208). These values are refined via iterations through the iterative factor 226 and weight 228 determination feedback loop.

In each iteration through the machine learning feedback loop, information from the application data repository 202, the factor and weight repository 218, and a machine learning model 236 from the indexed machine learning models 214 may be provided to and stored for a period of time in temporary storage 204 and used for the parallel automated weight calculation 206 and automated factor calculation 208. Automated weight calculation 206 corresponds to the determination of category weights 228 using linear regression techniques. Machine Learning and/ or linear regression techniques may be combined with predefined rules 230 (e.g., minimax rules) to improve the calculation of the weights 228. Rules 230 may be a subset of all of the computing task rules 126 described above with respect to FIG. 1. The determined values of the weights 228 may be subject to predefined constraints included in the rules 230. For example, weights 228 for a user 164 training-related factor 226 may be constrained such that computing applications 112*a-c* for which users 164 have never been trained are assigned a higher weight 228 than computing applications 112*a-c* for which users 164 were trained long ago (e.g., greater than one year ago). The weights 228 are stored in the indexed analysis temporary storage 210 for later use.

Automated factor calculation 208 corresponds to the determination of values of the factors 226 using Machine Learning and/or linear regression techniques, which are the same as or similar to those used to determine the weights 228. Rules 232 may be used in combination with the linear regression techniques to determine the factors 226. Rules 232 may be a subset of all of the computing task rules 126 described above with respect to FIG. 1. The determined values of the factors 226 may be subject to predefined constraints included in the rules 232. For example, these constraints may indicate that features are prioritized in an arbitrary order including but not limited to: data value>data availability>deployment exposure>user training>native language. The factors 226 are stored in the indexed analysis temporary storage 210 for later use.

The indexed analysis temporary storage 210 provides working storage for output of the automated weight calculation 206 and automated factor calculation 208 (e.g., the factors 226 and weights 228), which are then provided as an input for machine learning 212, using the machine learning model 236 of the current iteration of the machine learning feedback loop. Machine learning 212 performs cluster analysis using the machine learning model 236 of the data received from the indexed analysis temporary storage 210. Cluster analysis may be configured to reduce the cluster size in order to determine values of the factors 226 and weights 228 to provide to the indexed machine learning models 214, which provides working storage for the results 234, factors 226, and weights 228.

The combination of automated weight calculation 206 and automated factor calculation 208 with machine learning 212 may involve the use of curve fitting to identify values of the factors 226 and weights 228 that best fits results 234 determined using a number of machine learning models 214 (e.g., by iteratively determining a result 234 for each iteration's machine learning model 236 of the indexed machine learning models 214). For example, a result 234 may be determined, for each indexed machine learning model 214, as the summation of the product of each pair of factors 226 and weight 228, according to $$\text{Result} = \sum_{k=0}^{k=n} \text{factor}(k) \times \text{weight}(k)$$

where there are n factors 226 and n corresponding weights 228. This process is repeated to determine results 234 using the different indexed machine learning models 214. These results 234 represent a linear space against which curve-fitting can be performed. To determine factors 226 and weights 228 that best fit the results 234. Error in the determination of the factors 226 and weights 228 may be reduced using ordinary least squares analysis and other related techniques.

The best-fit factors 226 and weights 228 determined for the results 234 are provided to the automated prioritization 216, which provides the factors 226 and weights 228 to the factor and weight repository 218 for use in the next iteration of the factor 226 and weight 228 determination loop. This process is generally repeated until the values of the factors 226, weights 228, and/or results 234 stabilize (e.g., change by less than a predefined amount) between iterations. If this is the case, the results 234 may correspond to the finalized application priorities 142. Otherwise, if the results 234 have not stabilized between iterations, the factors 226 and weights 228 are passed to automated prioritization 216, which provides the factors 226 and weights 228 to the factor and weight repository 218 for use in the next iteration of the factor 226 and weight 228 determination loop. This process is generally repeated until the results 234 and corresponding factors 226 and weights 228 are stabilized.

Once the results 234 are stabilized, the results 234 are provided to the prioritized application repository 220, where the results 234 are used to determine the application priorities 142 of FIG. 1. The application priorities 142 are then provided for query-based analysis 222 and/or what-if query analysis 224, depending on the type of request 134, 136, 138 included in the query 132. For example, if the query 132 included a priority request 134 and/or resource request 136, the results 234 may be provided to query-based analysis 222. If the query 132 included a what-if request 138, the results 234 may be provided to the what-if query analysis 224. Query-based analysis 222 generally selects information from the results 234 to include in the query response 148 and may further determine an appropriate explanation 150, as described with respect to FIG. 1 above. What-if query analysis 224 similarly uses the results 234 to determine the anticipated impact 170 of a scenario provided with a what-if request 138 and may further aid in determining an appropriate explanation 150.

Example Operation of the Application Prioritization System

Figure 3:
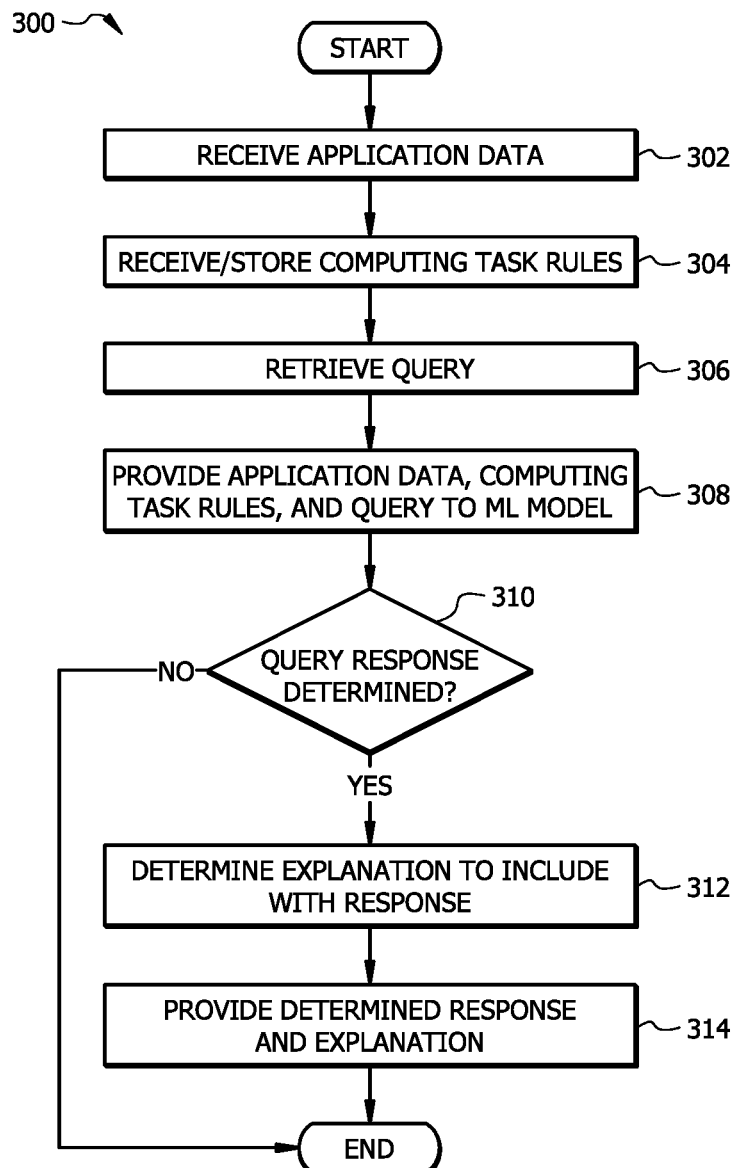
FIG. 3 is a flowchart of an example method of application prioritization using the system of FIG. 1.

FIG. 3 illustrates a method 300 for operating the system 100 of FIG. 1 in order to determine a response 146 to a received query 132. Method 300 may provide improved information in the form of response 146, which provides actionable information for more efficiently and reliably operating the computing infrastructure 102. The method 300 may be executed by the processor 118, memory 120, and network interface 122 of the application prioritization system 116. The method 300 may begin at step 302 where the application data 124 is received. As described above, the application data 124 generally includes characteristics of each of the computing applications 112a-c and users 164 of the computing applications 112a-c. Receiving the application data 124 at step 302 may involve providing a request and receiving a corresponding response that includes the application data 124 for the computing infrastructure 102. In some cases, receiving the application data 124 at step 302 involves monitoring the computing infrastructure 102 and its use and determining at least a portion of the application data 124.

At step 304, computing task rules 126 are received and/or stored (e.g., in the memory 120 of the application prioritization system 116). As described above, the computing task rules 126 include, for each type 128 of the computing tasks 114a-c associated with the computing applications 112a-c, a predefined value 130 indicating an extent to which the type 128 of the computing task 114a-c is critical for meeting a predefined computing infrastructure demand 162.

At step 306, a query 132 is received that includes one or more of a priority request 134, a resource request 136, and a what-if request 138, as described with respect to FIG. 1 above. The query 132 is generally provided from a user device 152 and may be received via the network interface 122 of the application prioritization system 116, as described with respect to FIG. 1 above.

At step 308, the application data 124, computing task rules 126, and query 132 are provided as an input to the feedback-based ML model 140. As described above with respect to FIGS. 1 and 2, the feedback-based ML model 140 may employ a combination of one or more machine learning models and linear regression in an iterative fashion to determine the application prioritizations 142. For example, the feedback-based machine learning model may be applied to the application data 124, the query 132, and the computing task rules 126 to iteratively determine factors and corresponding weights for the first computing application 112a and the second computing application 112b (see FIG. 2 and corresponding description above for further details of the feedback-based ML model 140 and its operation). These factors and weights may be used to determine the application prioritizations 142, and the application prioritization system 116 may select a portion of the application prioritizations 142 to include the query response 148.

At step 310, the application prioritization system 116 determines whether a query response 148 was successfully determined at step 308. For example, if the feedback-based ML model 140 successfully determined the application priorities 142 and/or query response 148 at step 308, then the application prioritization system 116 may determine that a query response 148 was determined. The application prioritization system 116 then proceeds to step 312. Otherwise, if a query response 148 was not successfully determined, the method 300 may end.

At step 312, the application prioritization system 116 determines an explanation 150 to include in the response 146. The explanation 150 may include a natural language description of the computing tasks 114a-c and/or associated analytical, organizational, or business needs that are being prioritized in order to obtain the query response 148. For instance, if the query 132 includes a priority request 134 to compare the priority 166a of the first computing application 112a to the priority 166b of the second computing application 112b and the query response 148 indicates that the first computing application 112a has a higher priority, the explanation 150 may include an indication of why the first computing application 112a has a higher priority 166a. Other examples of explanation 150 determined at step 312 are described with respect to FIG. 1 above.

At step 314, the response 146, which includes both the query response 148 determined by the feedback-based ML model 140 at step 308 and the explanation 150 from step 312, is provided (e.g., via network interface 122) to the user device 152 that sent the query 132 received at step 306. The provided response 146 includes information that was not previously efficiently or reliably available about operations and performance of the computing infrastructure 102 and may be used to improve operation of the computing infrastructure 102.

While several embodiments have been provided in this disclosure, it should be understood that the disclosed systems and methods might be embodied in many other specific forms without departing from the spirit or scope of this disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of this disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112 (f) as it exists on the date of filing hereof unless the words "means for" or "step for" are explicitly used in the particular claim.

What is claimed is:

1. A system, comprising:
   a computing infrastructure comprising a plurality of computing devices configured to implement computing applications, wherein execution of computing tasks associated with the computing applications is distributed amongst the plurality of computing devices; and
   an application prioritization system comprising:
      a memory operable to store computing task rules, wherein the computing task rules comprise, for each type of the computing tasks associated with the computing applications, a predefined value indicating an extent to which the type of the computing task is critical for meeting a predefined computing infrastructure demand; and
      a processor communicatively coupled to the memory and configured to:
         receive application data associated with the computing applications, wherein the application data comprises, for each computing application, characteristics of the computing application and users of the computing application;
         receive a first user request to determine a priority of a first computing application of the computing applications compared to a second computing application of the computing applications;
         determine, by applying a feedback-based machine learning model to at least a portion of the application data, the first user request, and the computing task rules, a first priority of the first computing application and a second priority of the second computing application and an explanation of the first and second priorities, wherein the first and second priorities provide an indication of whether the first computing application or the second computing application is more critical to functions of the computing infrastructure, wherein determining comprises:
            iteratively determining, using a combination of linear regression and machine learning, factors and corresponding weights for the first computing application and the second computing application, wherein each of the factors corresponds to a machine-learning-defined portion of the application data;
            determining the first priority for the first computing application based on the factors and corresponding weights for the first computing application;
            determining the second priority for the second computing application based on the factors and corresponding weights for the second computing application; and
            determining a larger of the first priority and the second priority;
         provide a response comprising an indication of the larger of the first priority and second priority and the explanation, wherein the explanation provides a description of why one of the first priority and the second priority is higher than the other, and wherein the response facilitates adjusting allocation of one or more of the computing tasks and the computing applications to the plurality of computing devices of the computing infrastructure; and
         executing one or more of the computing tasks associated with one or more of the computing applications based on the adjusted allocation.

2. The system of claim 1, wherein the application data comprises, for each of the computing applications, one or more of a number of users of the computing application, an amount of time the computing application is used, and an amount of time the computing application is used per user.

3. The system of claim 1, wherein the application data comprises a current allocation of the computing tasks associated with the computing applications amongst the plurality of computing devices.

4. The system of claim 3, wherein the processor is further configured to:
   receive a second user request for an amount of the computing infrastructure that is used to execute the first computing application;
   determine, by applying the feedback-based machine learning model to at least the portion of the application data and the second user request, the amount of the computing infrastructure that is used to execute the first computing application; and
   provide the determined amount of the computing infrastructure that is used to execute the first computing application.

5. The system of claim 1, wherein the processor is further configured to:
   receive a second user request for an anticipated impact of a scenario corresponding to removal of the first computing application from the computing infrastructure;
   determine, by applying the feedback-based machine learning model to at least the portion of the application data, the second user request, and the computing task rules, the anticipated impact of the scenario, the anticipated impact comprising an amount of computing tasks that would fail to be completed with the first computing application removed; and
   provide the determined anticipated impact.

6. The system of claim 1, wherein the processor is further configured to:
   receive a second user request for an anticipated impact of a scenario corresponding to removal of a first computing device from the computing infrastructure;
   determine, by applying the feedback-based machine learning model to at least the portion of the application data, the second user request, and the computing task rules, the anticipated impact of the scenario, the anticipated impact comprising an amount of computing tasks that would fail to be completed with the first computing device removed; and
   provide the determined anticipated impact.

7. A method comprising:
   storing computing task rules associated with a computing infrastructure, wherein:
      the computing infrastructure comprising a plurality of computing devices configured to implement computing applications, wherein execution of computing tasks associated with the computing applications is distributed amongst the plurality of computing devices; and the computing task rules comprise, for each type of the computing tasks associated with the computing applications, a predefined value indicating an extent to which the type of the computing task is critical for meeting a predefined computing infrastructure demand; and receiving application data associated with the computing applications, wherein the application data comprises, for each computing application, characteristics of the computing application and users of the computing application;

receiving a first user request to determine a priority of a first computing application of the computing applications compared to a second computing application of the computing applications;

determining, by applying a feedback-based machine learning model to at least a portion of the application data, the first user request, and the computing task rules, a first priority of the first computing application and a second priority of the second computing application and an explanation of the first and second priorities, wherein the first and second priorities provide an indication of whether the first computing application or the second computing application is more critical to functions of the computing infrastructure, wherein determining comprises:

iteratively determining, using a combination of linear regression and machine learning, factors and corresponding weights for the first computing application and the second computing application, wherein each of the factors corresponds to a machine-learning-defined portion of the application data;

determining the first priority for the first computing application based on the factors and corresponding weights for the first computing application;

determining the second priority for the second computing application based on the factors and corresponding weights for the second computing application; and determining a larger of the first priority and the second priority;

providing a response comprising an indication of the larger of the first priority and second priority and the explanation; and executing one or more of the computing tasks associated with one or more of the computing applications based on the adjusted allocation.

8. The method of claim 7, wherein the application data comprises, for each of the computing applications, one or more of a number of users of the computing application, an amount of time the computing application is used, and an amount of time the computing application is used per user.

9. The method of claim 7, wherein the application data comprises a current allocation of the computing tasks associated with the computing applications amongst the plurality of computing devices.

10. The method of claim 9, wherein the processor is further configured to:

receive a second user request for an amount of the computing infrastructure that is used to execute the first computing application;

determine, by applying the feedback-based machine learning model to at least the portion of the application data and the second user request, the amount of the computing infrastructure that is used to execute the first computing application; and provide the determined amount of the computing infrastructure that is used to execute the first computing application.

11. The method of claim 7, further comprising:

receiving a second user request for an anticipated impact of a scenario corresponding to removal of the first computing application from the computing infrastructure;

determining, by applying the feedback-based machine learning model to the application data, the second user request, and the computing task rules, the anticipated impact of the scenario, the anticipated impact comprising an amount of computing tasks that would fail to be completed with the first computing application removed; and providing the determined anticipated impact.

12. A system comprising:

a memory operable to store computing task rules associated with a computing infrastructure, wherein:

the computing infrastructure comprises a plurality of computing devices configured to implement computing applications, wherein execution of computing tasks associated with the computing applications is distributed amongst the plurality of computing devices; and the computing task rules comprise, for each type of the computing tasks associated with the computing applications, a predefined value indicating an extent to which the type of the computing task is critical for meeting a predefined computing infrastructure demand; and a processor communicatively coupled to the memory and configured to:

receive application data associated with the computing applications, wherein the application data comprises, for each computing application, characteristics of the computing application and users of the computing application;

receive a first user request to determine a priority of a first computing application of the computing applications compared to a second computing application of the computing applications;

determine, by applying a feedback-based machine learning model to at least a portion of the application data, the first user request, and the computing task rules, a first priority of the first computing application and a second priority of the second computing application and an explanation of the first and second priorities, wherein the first and second priorities provide an indication of whether the first computing application or the second computing application is more critical to functions of the computing infrastructure, wherein determining comprises:

iteratively determining, using a combination of linear regression and machine learning, factors and corresponding weights for the first computing application and the second computing application, wherein each of the factors corresponds to a machine-learning-defined portion of the application data;

determining the first priority for the first computing application based on the factors and corresponding weights for the first computing application;

determining the second priority for the second computing application based on the factors and corresponding weights for the second computing application;

provide a response comprising an indication of the larger of the first priority and second priority and the explanation; and execute one or more of the computing tasks associated with one or more of the computing applications based on the adjusted allocation.

13. The system of claim 12, wherein the application data comprises, for each of the computing applications, one or more of a number of users of the computing application, an amount of time the computing application is used, and an amount of time the computing application is used per user.

14. The system of claim 12, wherein the application data comprises a current allocation of the computing tasks associated with the computing applications amongst the plurality of computing devices.

15. The system of claim 14, wherein the processor is further configured to:

receive a second user request for an amount of the computing infrastructure that is used to execute the first computing application;

determine, by applying the feedback-based machine learning model to at least the portion of the application data and the second user request, the amount of the computing infrastructure that is used to execute the first computing application; and provide the determined amount of the computing infrastructure that is used to execute the first computing application.

16. The system of claim 12, wherein the processor is further configured to:

receive a second user request for an anticipated impact of a scenario corresponding to removal of the first computing application from the computing infrastructure;

determine, by applying the feedback-based machine learning model to at least the portion of the application data, the second user request, and the computing task rules, the anticipated impact of the scenario, the anticipated impact comprising an amount of computing tasks that would fail to be completed with the first computing application removed; and provide the determined anticipated impact.

17. The system of claim 12, wherein the processor is further configured to:

receive a second user request for an anticipated impact of a scenario corresponding to removal of a first computing device from the computing infrastructure;

determine, by applying the feedback-based machine learning model to at least the portion of the application data, the second user request, and the computing task rules, the anticipated impact of the scenario, the anticipated impact comprising an amount of computing tasks that would fail to be completed with the first computing device removed; and provide the determined anticipated impact.

* * * * *